United States Patent
Ito

(10) Patent No.: US 8,077,136 B2
(45) Date of Patent: Dec. 13, 2011

(54) ELECTRO-OPTICAL DEVICE AND ELECTRONIC APPARATUS

(75) Inventor: Tomoyuki Ito, Okaya (JP)

(73) Assignee: Sony Corporation, Tokyo (JP)

( * ) Notice: Subject to any disclaimer, the term of this patent is extended or adjusted under 35 U.S.C. 154(b) by 1092 days.

(21) Appl. No.: 11/705,459

(22) Filed: Feb. 13, 2007

(65) Prior Publication Data

US 2007/0216637 A1 Sep. 20, 2007

(30) Foreign Application Priority Data

Mar. 16, 2006 (JP) .................................. 2006-072272

(51) Int. Cl.
*G09G 3/36* (2006.01)

(52) U.S. Cl. .......................................... 345/102; 345/87

(58) Field of Classification Search ............... 178/18.01, 178/18.09, 18.11, 19.01, 19.05; 345/156–158, 345/173, 175, 176, 179–183, 204, 207, 697, 345/102

See application file for complete search history.

(56) References Cited

U.S. PATENT DOCUMENTS

| 5,838,308 | A | * | 11/1998 | Knapp et al. | 345/173 |
|---|---|---|---|---|---|
| 7,166,966 | B2 | * | 1/2007 | Naugler et al. | 315/149 |
| 7,280,102 | B2 | * | 10/2007 | Abileah et al. | 345/204 |
| 7,586,479 | B2 | | 9/2009 | Park et al. | |
| 2006/0262055 | A1 | | 11/2006 | Takahara | |

FOREIGN PATENT DOCUMENTS

| JP | B2 2791620 | 6/1998 |
|---|---|---|
| JP | A 11-14962 | 1/1999 |
| JP | A 11-119898 | 4/1999 |
| JP | B2 2907057 | 4/1999 |
| JP | A 2004-45875 | 2/2004 |
| JP | A-2005-352490 | 12/2005 |
| JP | A-2007-102154 | 4/2007 |

* cited by examiner

*Primary Examiner* — Nitin Patel
(74) *Attorney, Agent, or Firm* — K&L Gates LLP

(57) ABSTRACT

An electro-optical device includes a display unit having a plurality of pixels, and the display unit is divided into a plurality of areas. The electro-optical device also includes a plurality of optical sensors that are provided for the plurality of areas, each of the optical sensors being configured to detect a light intensity, and a controller that selectively performs recognition of an operation position on the display unit or measurement of an ambient light intensity on the basis of the light intensities detected by the plurality of optical sensors.

5 Claims, 13 Drawing Sheets

ELECTRO-OPTICAL DEVICE AND ELECTRONIC APPARATUS

BACKGROUND

1. Technical Field

The present invention relates to electro-optical devices and electronic apparatuses.

2. Related Art

Electro-optical devices for liquid crystal display apparatuses have been known. The electro-optical devices include, for example, a liquid crystal panel, and a backlight for supplying light to the liquid crystal panel.

The liquid crystal panel includes an element substrate having thin film transistors (TFTs) serving as switching elements, described below, arranged in a matrix, a counter substrate facing the element substrate, and a liquid crystal as an electro-optical material disposed between the element substrate and the counter substrate.

The element substrate includes a plurality of scanning lines disposed at predetermined intervals, and a plurality of data lines crossing those scanning lines and disposed at predetermined intervals.

Pixels are disposed at intersections of the scanning lines and the data lines. Each of the pixels includes the TFT described above, and a pixel electrode. The pixels are arranged in a matrix to form a display area. Gate electrodes of the TFTs are connected to the scanning lines, and source electrodes of the TFTs are connected to the data lines. Drain electrodes of the TFTs are connected to the pixel electrodes.

The counter substrate includes a common electrode disposed so as to face the pixel electrodes.

The electro-optical devices operate as follows: a selection voltage is supplied to the scanning lines in a line-sequential manner to select all the pixels corresponding to a desired one of the scanning lines. Image signals are supplied to the data lines in synchronization with the selection of the pixels. Thus, the image signals are supplied to all the pixels selected by the selection voltage, thereby writing image data to the pixel electrodes.

When the image data is written to the pixel electrodes, due to the difference in potential between the pixel electrodes and the common electrode, drive voltages are applied to the liquid crystal. This changes the alignment or orientation of the liquid crystal to change the light from the backlight transmitted through the liquid crystal, thus achieving gradation display.

One of those electro-optical devices is a liquid crystal panel having a touch key function (see, for example, JP-A-11-119898).

In a touch panel disclosed in JP-A-11-119898, an area sensor is disposed on the liquid crystal panel. The area sensor includes photoelectric conversion elements disposed at predetermined intervals for converting light into electrical signals.

When an input pen is operated on a display screen of the liquid crystal panel, the light from the backlight is reflected by the tip of the input pen, and the reflected light is converted into an electrical signal by the corresponding photoelectric conversion element. The electrical signal is detected to specify the position of the input pen on the area sensor.

The visibility of the display of electro-optical devices depends on the ambient brightness around the electro-optical devices based on ambient light such as sunlight. That is, as the ambient brightness around the electro-optical devices increases, the contrast between the brightness of the display areas of the electro-optical devices and the ambient brightness around the electro-optical devices is reduced, resulting in low visibility of the display of the electro-optical devices.

One solution to overcome this problem is to measure the ambient light intensity to adjust the contrast between the brightness of the display area and the ambient brightness. However, the electro-optical device disclosed in JP-A-11-119898 is not configured to measure the ambient light intensity and it is therefore difficult to increase the visibility of the display.

SUMMARY

An advantage of some aspects of the invention is that it provides an electro-optical device that can be used as a touch panel and that can measure the ambient light intensity, and an electronic apparatus.

According to an aspect of the invention, there is provided an electro-optical device including a display unit having a plurality of pixels, the display unit being divided into a plurality of areas; a plurality of optical sensors that are provided for the plurality of areas, each of the optical sensors being configured to detect a light intensity; and a controller that selectively performs recognition of an operation position on the display unit or measurement of an ambient light intensity on the basis of the light intensities detected by the plurality of optical sensors.

According to the aspect of the invention, the display unit is divided into a plurality of areas, and the plurality of optical sensors that are provided for the plurality of areas and the controller that selectively performs recognition of the operation position on the display unit or measurement of the ambient light intensity on the basis of light intensities detected by the plurality of optical sensors are provided. Thus, the optical sensors can be used as devices for recognizing the operation position on the display unit, and can also be used as devices for measuring the ambient light intensity. Therefore, the electro-optical device can be used as a touch panel and can also measure the ambient light intensity.

Although ambient light has a substantially constant intensity, for example, when the ambient light is shielded by an operation performed on the display unit or light from a light source is reflected, the light intensities detected by the optical sensors may have unique values. The controller that selectively performs recognition of the operation position on the display unit or measurement of the ambient light intensity on the basis of the light intensities detected by the plurality of optical sensors allows selective provision of a period during which the operation position on the display unit is recognized and a period during which the ambient light intensity is measured. Therefore, even if a unique light intensity is detected by an operation performed on the display unit, the ambient light intensity can be determined without taking the unique light intensity into consideration, and measurement accuracy of the ambient light intensity can be increased.

It is preferable that the optical sensors are provided in correspondence with the pixels.

Since the optical sensors are provided in correspondence with the pixels, the operation position on the display unit can be recognized on a pixel-by-pixel basis, and the ambient light intensity can be measured on a pixel-by-pixel basis.

It is preferable that the electro-optical device further includes a light source that supplies light to the display unit, and a light source controller that controls an intensity of light of the light source according to the ambient light intensity measured by the controller.

Since the light source and the light source controller are provided, the intensity of light supplied from the light source can be controlled according to the ambient brightness around the electro-optical device. The visibility of the display of the electro-optical device can therefore be increased regardless of the ambient brightness around the electro-optical device.

It is preferable that the controller measures an ambient light intensity according to a light intensity that is within a predetermined range among the light intensities detected by the plurality of optical sensors.

Accordingly, the ambient light intensity is measured according to a light intensity that is within a predetermined range among the light intensities detected by the plurality of optical sensors. Therefore, even if a unique light intensity is detected by an operation performed on the display unit, the ambient light intensity can be determined without taking the unique light intensity into consideration, and measurement accuracy of the ambient light intensity can be increased.

It is preferable that the controller recognizes an operation position on the display unit according to a light intensity detected by an optical sensor that is located in a predetermined area among the plurality of optical sensors, and measures an ambient light intensity according to a light intensity detected by an optical sensor that is located in an area other than the predetermined area among the plurality of optical sensors.

Accordingly, the ambient light intensity is measured according to a light intensity detected by an optical sensor that is located in an area other than the predetermined area among the plurality of optical sensors. Therefore, even if a unique light intensity is detected by whatever operation performed within the predetermined area, the ambient light intensity can be measured without taking the unique light intensity into consideration, and measurement accuracy of the ambient light intensity can further be increased.

According to another aspect of the invention, there is provided an electronic apparatus including the above-described electro-optical device.

According to the aspect of the invention, similar advantages to those described above can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
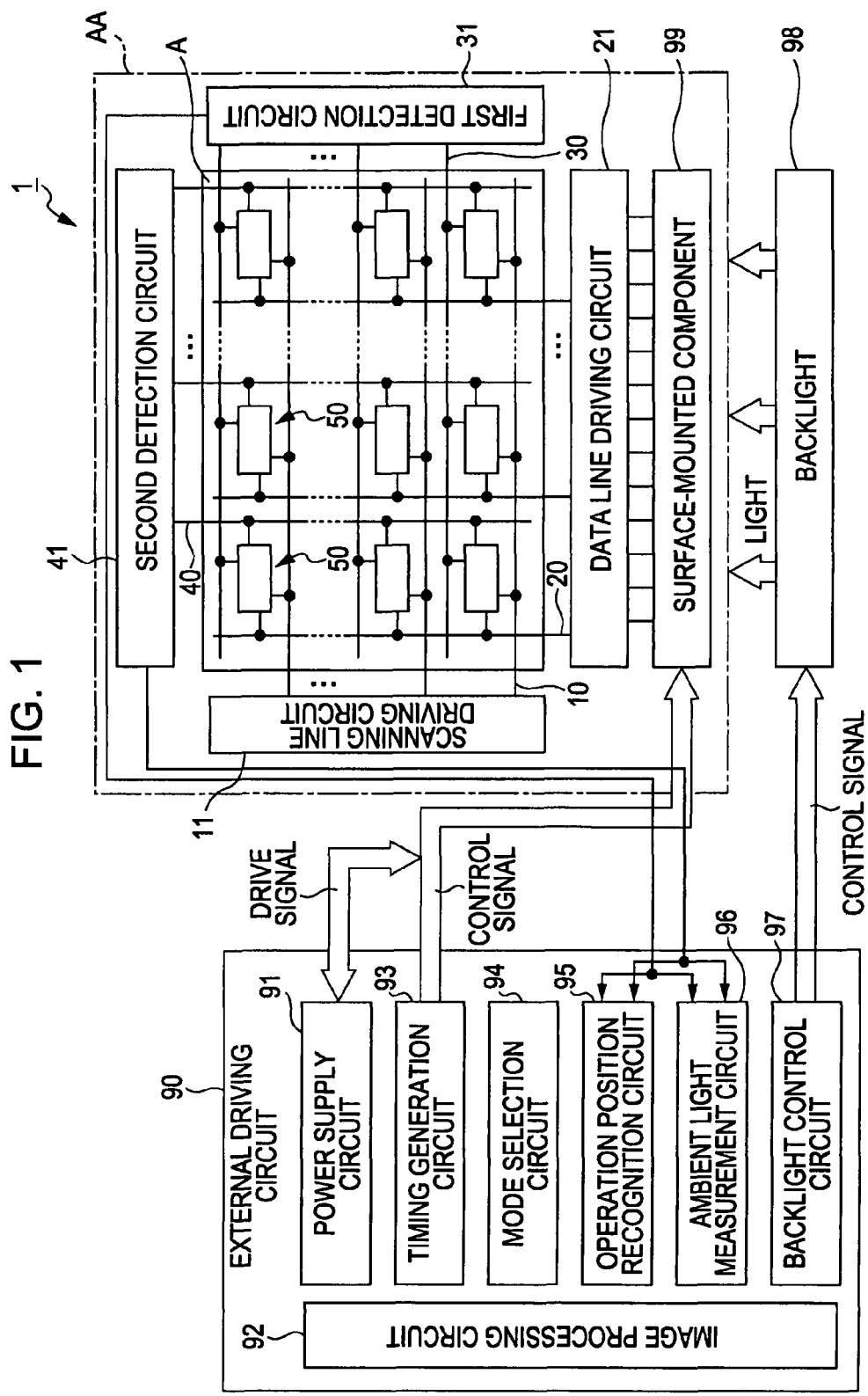
FIG. 1 is a block diagram showing the structure of an electro-optical device according to a first embodiment of the invention.

Exemplary embodiments of the invention will be described with reference to the drawings. In the following description of embodiments and modifications, the same elements are denoted by the same reference numerals, and a description thereof is omitted or simplified.

First Embodiment

FIG. 1 is a block diagram showing the structure of an electro-optical device 1 according to a first embodiment of the invention.

The electro-optical device 1 includes a liquid crystal panel AA, an external driving circuit 90 that drives the liquid crystal panel AA, and a backlight 98 serving as a light source that irradiates the liquid crystal panel AA with light. The electro-optical device 1 performs transmission type display using the light from the backlight 98, and acts as a touch panel to perform display in accordance with an operation of an input pen 100 (see FIG. 7) on a display area A, described below.

The liquid crystal panel AA includes a plurality of scanning lines 10, a plurality of data lines 20 crossing the scanning lines 10 and disposed at predetermined intervals, and pixels 50 disposed at intersections of the scanning lines 10 and the data lines 20. In the liquid crystal panel AA, the pixels 50 are arranged to form a display area A. A scanning line driving circuit 11 and a data line driving circuit 21 that drive the pixels 50, a first detection circuit 31 facing the scanning line driving circuits 11, and a second detection circuit 41 facing the data line driving circuit 21 are disposed around the display area A. A surface-mounted component 99 that interfaces between the liquid crystal panel AA and the external driving circuit 90 is disposed in the vicinity of the data line driving circuit 21.

Figure 2:
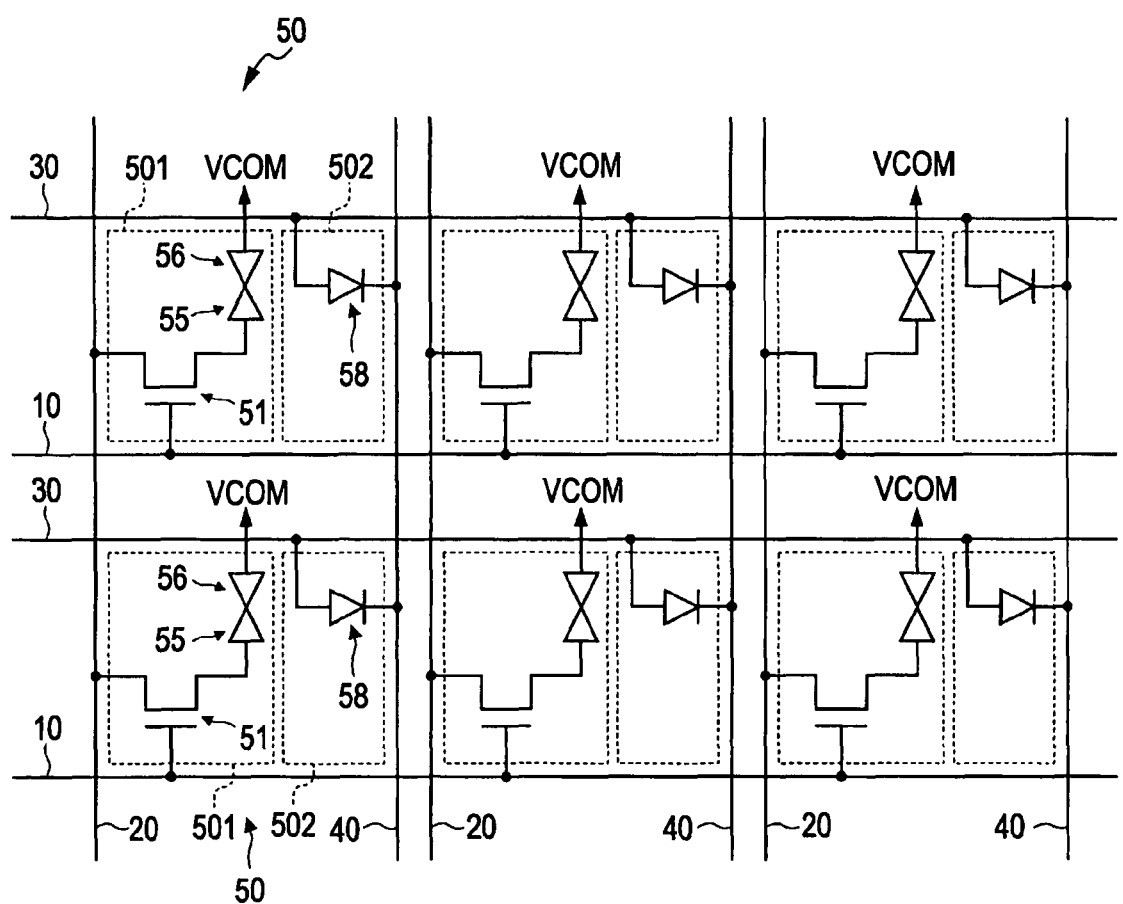
FIG. 2 is a circuit diagram showing the transistor level of pixels of the electro-optical device.

FIG. 2 is a circuit diagram showing the transistor level of the pixels 50.

Each of the pixels 50 includes a pixel display section 501 that performs display, and an optical sensor section 502 that detects a light intensity.

The pixel display section 501 includes a pixel transistor 51 serving as a switching element, a pixel electrode 55, and a common electrode 56 facing the pixel electrode 55.

A gate electrode of the pixel transistor 51 is connected to the scanning line 10, a source electrode of the pixel transistor 51 is connected to the data line 20, and a drain electrode of the pixel transistor 51 is connected to the pixel electrode 55. A liquid crystal is held between the pixel electrode 55 and the common electrode 56. The pixel transistor 51 is supplied with a selection voltage from the scanning line 10 to thereby conduct between the data line 20 and the pixel electrode 55.

The optical sensor section 502 includes a photodiode 58 that converts light into an electrical signal.

An anode electrode of the photodiode 58 is connected to a first sense line 30 extending along the scanning line 10, and a cathode electrode of the photodiode 58 is connected to a second sense line 40 extending along the data line 20. The photodiode 58 is applied with a reverse bias voltage from the second sense line 40 to thereby output a current corresponding to the intensity of the received light. Specifically, when the intensity of the received light is high, the photodiode 58 outputs from the cathode electrode to the anode electrode a current that is larger than when the intensity of the received light is low. The currents output from the photodiodes 58 are supplied from the second sense lines 40 to the cathode electrodes, and are then output from the anode electrodes to the first sense lines 30.

The current flowing through each of the first sense lines 30 is equal to the sum of the currents output from some of the photodiodes 58 that are adjacent in the direction in which the scanning lines 10 extend. Thus, when the intensity of the received light differs from one photodiode 58 to another, the currents flowing through the first sense lines 30 are different.

The current flowing through each of the second sense lines 40 is equal to the sum of the currents input to some of the photodiodes 58 that are adjacent in the direction in which the data lines 20 extend. Thus, when the intensity of the received light differs from one photodiode 58 to another, the currents flowing through the second sense lines 40 are different.

Referring back to FIG. 1, the scanning line driving circuit 11 supplies a selection voltage for bringing the pixel transistors 51 into conduction to the scanning lines 10 in a line-sequential manner. For example, when the selection voltage is supplied to a given one of the scanning lines 10, all the pixel transistors 51 connected to the given one of the scanning lines 10 are brought into conduction, and all the pixels 50 associated with the given one of the scanning lines 10 are selected.

The data line driving circuit 21 supplies image signals to the data lines 20, and sequentially writes image data to the pixel electrodes 55 of the pixels 50 through the pixel transistors 51 that are turned on.

When the image data is written to the pixel electrodes 55, due to the difference in potential between the pixel electrodes 55 and the common electrode 56, drive voltages are applied to the liquid crystal. Thus, by changing the voltages of the image signals, the alignment or orientation of the liquid crystal is changed to provide gradation display by light modulation of the pixels 50.

Figure 3:
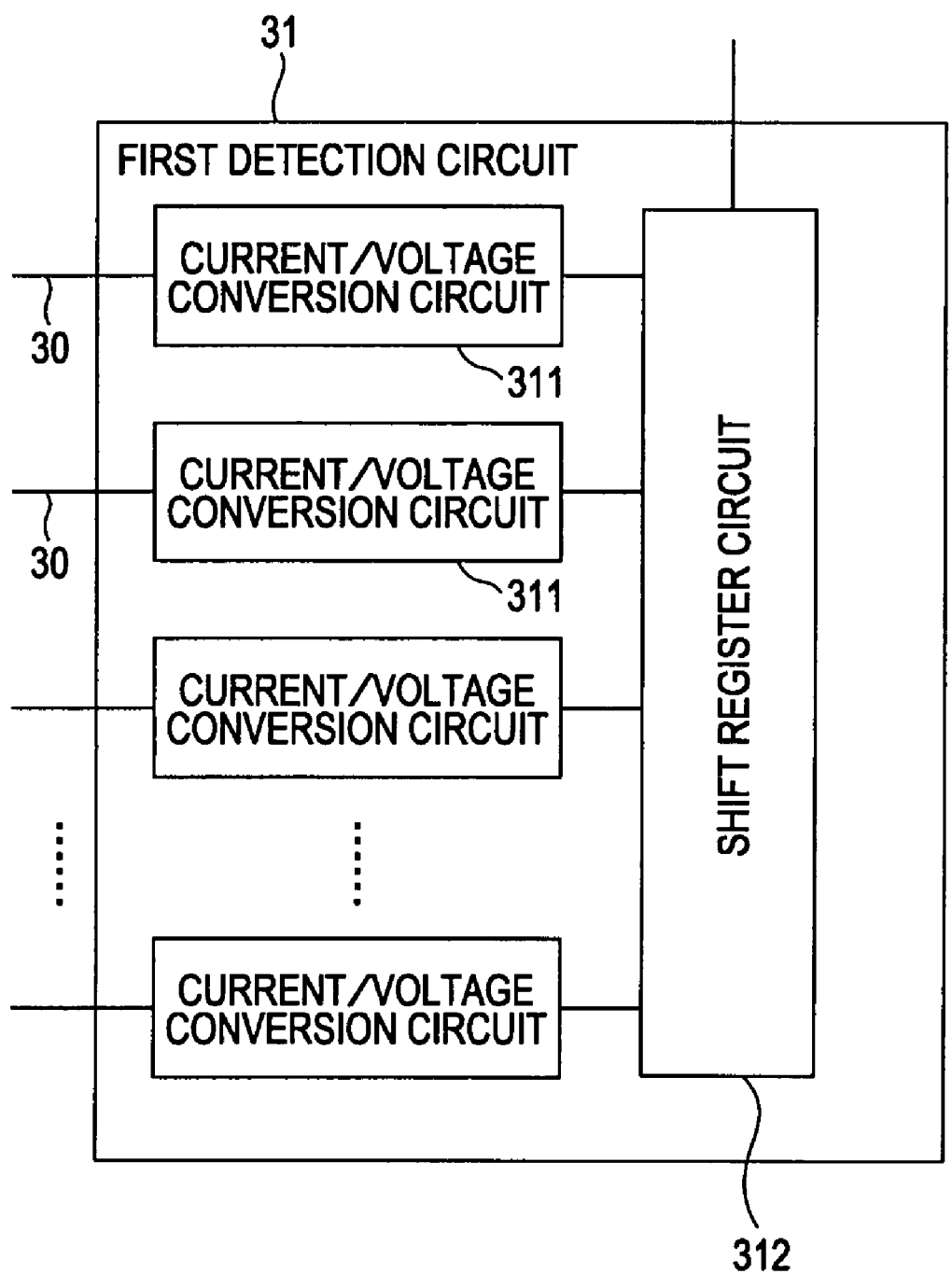
FIG. 3 is a block diagram showing the structure of a first detection circuit of the electro-optical device.

FIG. 3 is a block diagram showing the structure of the first detection circuit 31.

The first detection circuit 31 includes a plurality of current-to-voltage conversion circuits 311 that are provided for the first sense lines 30 in one-to-one relation and that convert the currents flowing through the first sense lines 30 into voltages, and a shift register circuit 312 that converts the voltages output from the current-to-voltage conversion circuits 311 into serial voltage signals. The first detection circuit 31 converts the currents flowing through the first sense lines 30 into serial voltage signals, and outputs the serial voltage signals.

Figure 4:
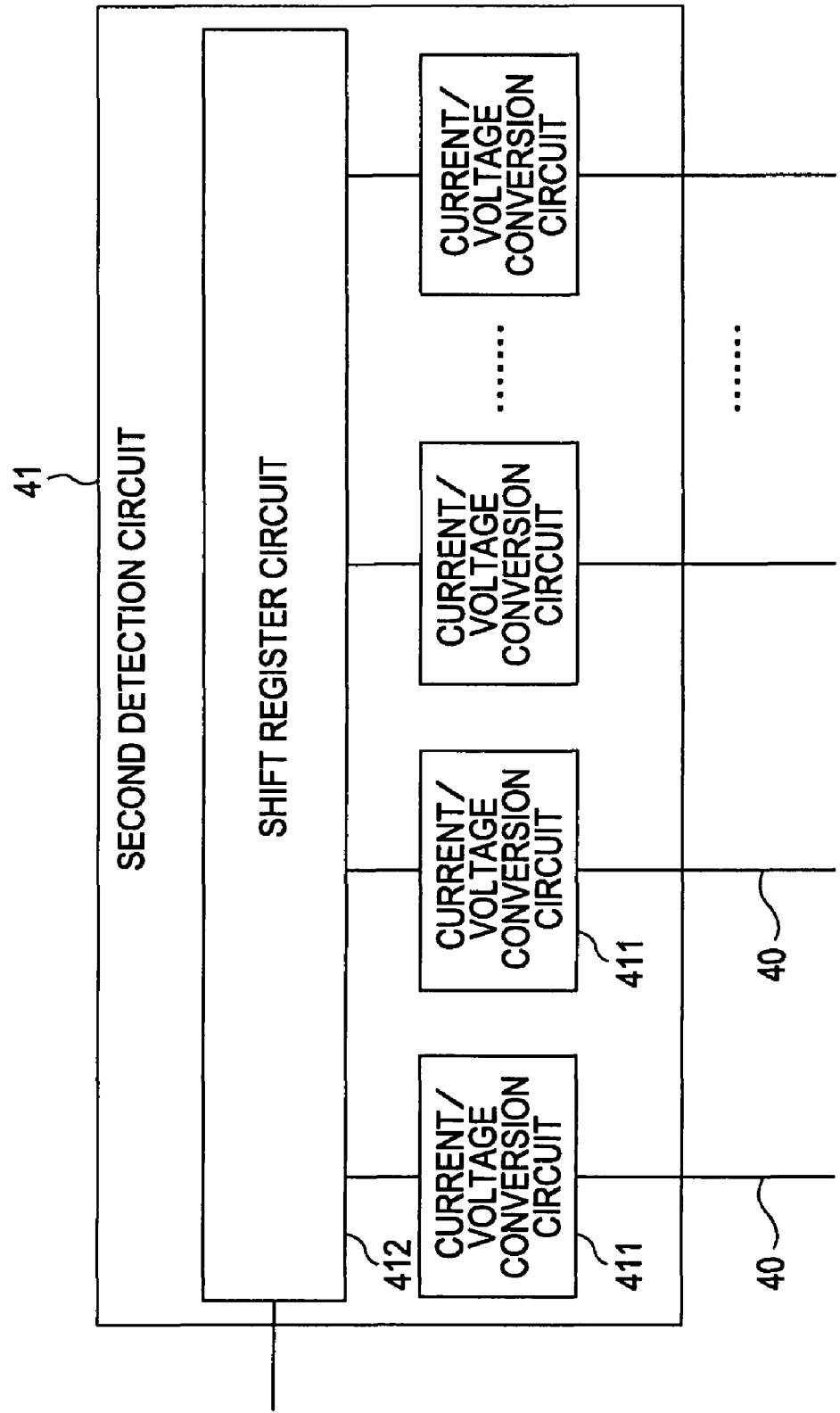
FIG. 4 is a block diagram showing the structure of a second detection circuit of the electro-optical device.

FIG. 4 is a block diagram showing the structure of the second detection circuit 41.

The second detection circuit 41 includes a plurality of current-to-voltage conversion circuits 411 that are provided for the second sense lines 40 in one-to-one relation and that convert the currents flowing through the second sense lines 40 into voltages, and a shift register circuit 412 that convert the voltages output from the current-to-voltage conversion circuits 411 into serial voltage signals. The second detection circuit 41 converts the currents flowing through the second sense lines 40 into serial voltage signals, and outputs the serial voltage signals.

Referring back to FIG. 1, the backlight 98 is disposed on the back surface of the liquid crystal panel AA. The backlight 98 is formed of, for example, a cold cathode fluorescent lamp (CCFL) or light emitting diode (LED), and emits light to supply the light to the pixels 50 of the liquid crystal panel AA.

The external driving circuit 90 includes a power supply circuit 91 that supplies power to the liquid crystal panel AA, an image processing circuit 92 that supplies image signals to the liquid crystal panel AA, a timing generation circuit 93 that outputs a clock signal or a start signal to the image processing circuit 92 or the liquid crystal panel AA, a mode selection circuit 94 that selects an operation mode of the electro-optical device 1, an operation position recognition circuit 95 serving as a controller that outputs position information of the input pen 100 on the display area A to the image processing circuit 92, an ambient light measurement circuit 96 serving as a controller that measures the ambient light intensity, and a backlight control circuit 97 that controls the intensity of light supplied from the backlight 98 to the pixels 50 according to the ambient light intensity measured by the ambient light measurement circuit 96.

The power supply circuit 91 supplies a drive signal to the liquid crystal panel AA to drive the scanning line driving circuit 11 and the data line driving circuit 21.

The timing generation circuit 93 generates a clock signal or a start signal in synchronization with input image data that is input to the image processing circuit 92, and supplies the generated signal to the scanning line driving circuit 11 and the data line driving circuit 21 on the liquid crystal panel AA. The timing generation circuit 93 further generates various timing signals, and outputs the generated signals to the image processing circuit 92.

The mode selection circuit 94 can select a normal display mode or a touch panel mode. In the normal display mode, the electro-optical device 1 performs only liquid crystal display. In the touch panel mode, the electro-optical device 1 performs liquid crystal display and also operates as a touch panel.

The operation position recognition circuit 95 receives the signals output from the first and second detection circuits 31 and 41. The operation position recognition circuit 95 operates only in the touch panel mode, but does not operate in the normal display mode. In the touch panel mode, the operation position recognition circuit 95 recognizes the position of the input pen 100 on the display area A on the basis of the signals output from the first and second detection circuits 31 and 41, and outputs position information of the input pen 100 to the image processing circuit 92. In the normal display mode, on the other hand, the operation position recognition circuit 95 does not recognize the position of the input pen 100 on the display area A on the basis of the signals output from the first and second detection circuits 31 and 41, and does not output position information of the input pen 100 to the image processing circuit 92.

The image processing circuit 92 performs gamma correction on input image data in consideration of light transmission characteristics of the liquid crystal panel AA, followed by digital-to-analog (D/A) conversion on image data of each color to generate an image signal, and supplies the generated image signals to the liquid crystal panel AA. When the operation position recognition circuit 95 outputs position information of the input pen 100, the image processing circuit 92 generates the image signals based on the position information of the input pen 100.

The ambient light measurement circuit 96 receives the signals output from the first and second detection circuits 31 and 41. The ambient light measurement circuit 96 operates only in the normal display mode, but does not operate in the touch panel mode. In the normal display mode, the ambient light measurement circuit 96 measures the ambient light intensity according to a voltage signal that is within a predetermined voltage range among the serial voltage signals output from the first and second detection circuits 31 and 41, and outputs a light intensity signal relating to the ambient light intensity to the backlight control circuit 97. In the touch panel mode, on the other hand, the ambient light measurement circuit 96 does not measure the ambient light intensity according to a voltage signal that is within a predetermined voltage range among the serial voltage signals output from the first and second detection circuits 31 and 41, and does not output a light intensity signal to the backlight control circuit 97.

The backlight control circuit 97 controls the intensity of light supplied from the backlight 98 to the pixels 50. When the ambient light measurement circuit 96 outputs a light intensity signal relating to the ambient light intensity, the backlight control circuit 97 controls the intensity of light supplied from the backlight 98 to the pixels 50 according to the light intensity signal.

Figure 5:
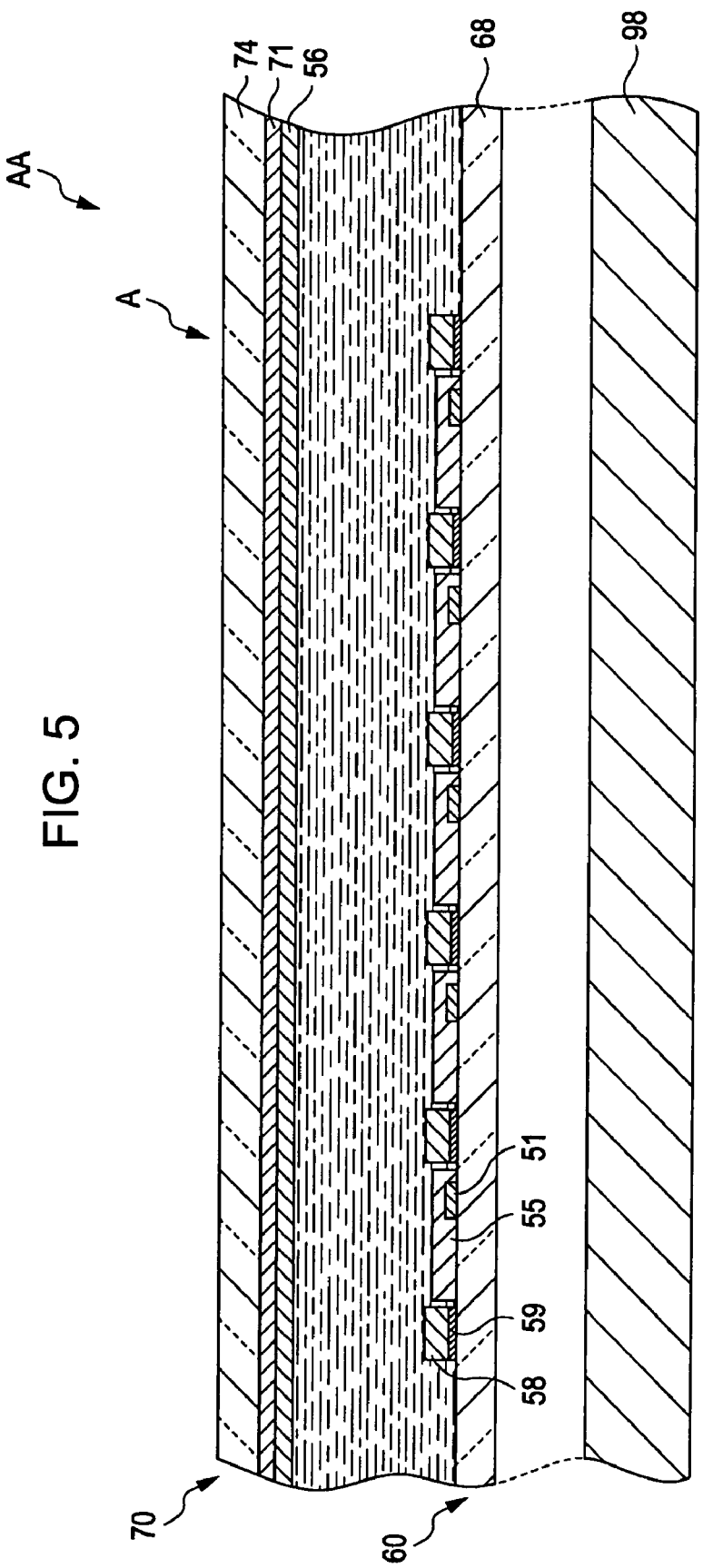
FIG. 5 is a partial cross-sectional view of a liquid crystal panel of the electro-optical device.

FIG. 5 is a partial cross-sectional view of the liquid crystal panel AA.

As shown in FIG. 5, the liquid crystal panel AA includes an element substrate 60 having the pixel transistors 51 arranged thereon, a counter substrate 70 facing the element substrate 60, and a liquid crystal as an electro-optical material that is held between the element substrate 60 and the counter substrate 70.

The element substrate 60 has a glass substrate 68, and the pixel transistors 51 and light-shielding films 59 are alternately formed on the glass substrate 68 at predetermined intervals. The pixel electrodes 55 are formed on the pixel transistors 51, and the photodiodes 58 are formed on the light-shielding films 59.

The counter substrate 70 has a glass substrate 74, and a color filter layer 71 is formed on the glass substrate 74.

The common-electrode 56, which is formed of a transparent conductive film such as an indium tin oxide (ITO) or indium zinc oxide (IZO) film, is formed on the color filter layer 71 so as to face the pixel electrodes 55.

A liquid crystal layer is provided between the element substrate 60 and the counter substrate 70. The liquid crystal layer is sealed by a sealing member (not shown) that surrounds the element substrate 60 and the counter substrate 70.

Figure 6:
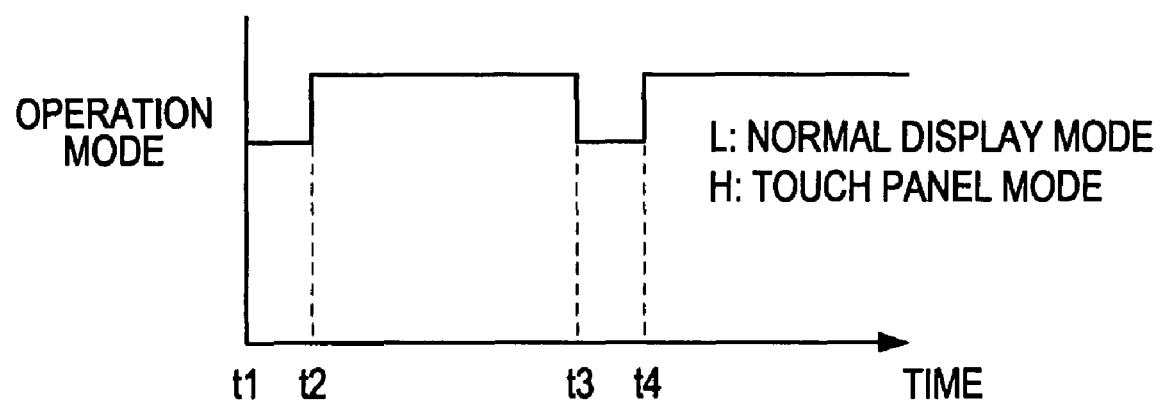
FIG. 6 is a timing chart of the electro-optical device.

FIG. 6 is a timing chart of the electro-optical device 1.

First, for a period from time t1 to time t2, the normal display mode is selected by the mode selection circuit 94, and the electro-optical device 1 performs only liquid crystal display.

Then, for a period from time t2 to time t3, the touch panel mode is selected by the mode selection circuit 94, and the electro-optical device 1 performs liquid crystal display and also operates as a touch panel.

Then, for a period from time t3 to time t4, the normal display mode is selected by the mode selection circuit 94, and the electro-optical device 1 performs only liquid crystal display.

In the electro-optical device 1, therefore, the normal display mode and the touch panel mode are alternately selected by the mode selection circuit 94. As described above, the electro-optical device 1 is configured such that the ambient light measurement circuit 96 selectively operates as the controller in the normal display mode among the operation position recognition circuit 95 and the ambient light measurement circuit 96, and the operation position recognition circuit 95 selectively operates as the controller in the touch panel mode among the operation position recognition circuit 95 and the ambient light measurement circuit 96.

The operation of the electro-optical device 1 will be described.

In the normal display mode, the electro-optical device 1 measures the ambient light intensity, and controls the intensity of light supplied from the backlight 98 to the pixels 50 according to the measured ambient light intensity.

Specifically, in the normal display mode, the electro-optical device 1 operates as follows: a current corresponding to the supplied ambient light intensity is output from each of the photodiodes 58. The currents flow through the first sense lines 30 and the second sense lines 40 connected to that photodiodes 58.

The currents flowing through the first sense lines 30 are converted into serial voltage signals by the first detection circuit 31, and the resulting signals are output to the operation position recognition circuit 95 and the ambient light measurement circuit 96. The currents flowing through the second sense lines 40 are converted into serial voltage signals by the second detection circuit 41, and the resulting signals are output to the operation position recognition circuit 95 and the ambient light measurement circuit 96.

Since the normal display mode is selected by the mode selection circuit 94, position information of the input pen 100 is not output from the operation position recognition circuit 95 to the image processing circuit 92 on the basis of the serial voltage signals output from the first and second detection circuits 31 and 41. Thus, the image processing circuit 92 generates the image signals without using the position information of the input pen 100, and supplies the generated image signals to the liquid crystal panel AA.

On the other hand, a light intensity signal relating to the ambient light intensity is output from the ambient light measurement circuit 96 to the backlight control circuit 97 according to a voltage signal that is within a predetermined voltage range among the serial voltage signals output from the first and second detection circuits 31 and 41.

When the light intensity signal is output from the ambient light measurement circuit 96, the backlight control circuit 97 controls the intensity of light supplied from the backlight 98 to the pixels 50 using the light intensity signal.

In the touch panel mode, the electro-optical device 1 recognizes the position of the input pen 100 on the display area A according to the ambient brightness, and therefore operates as a touch panel.

Specifically, in the touch panel mode, the electro-optical device 1 operates as follows.

Figure 7:
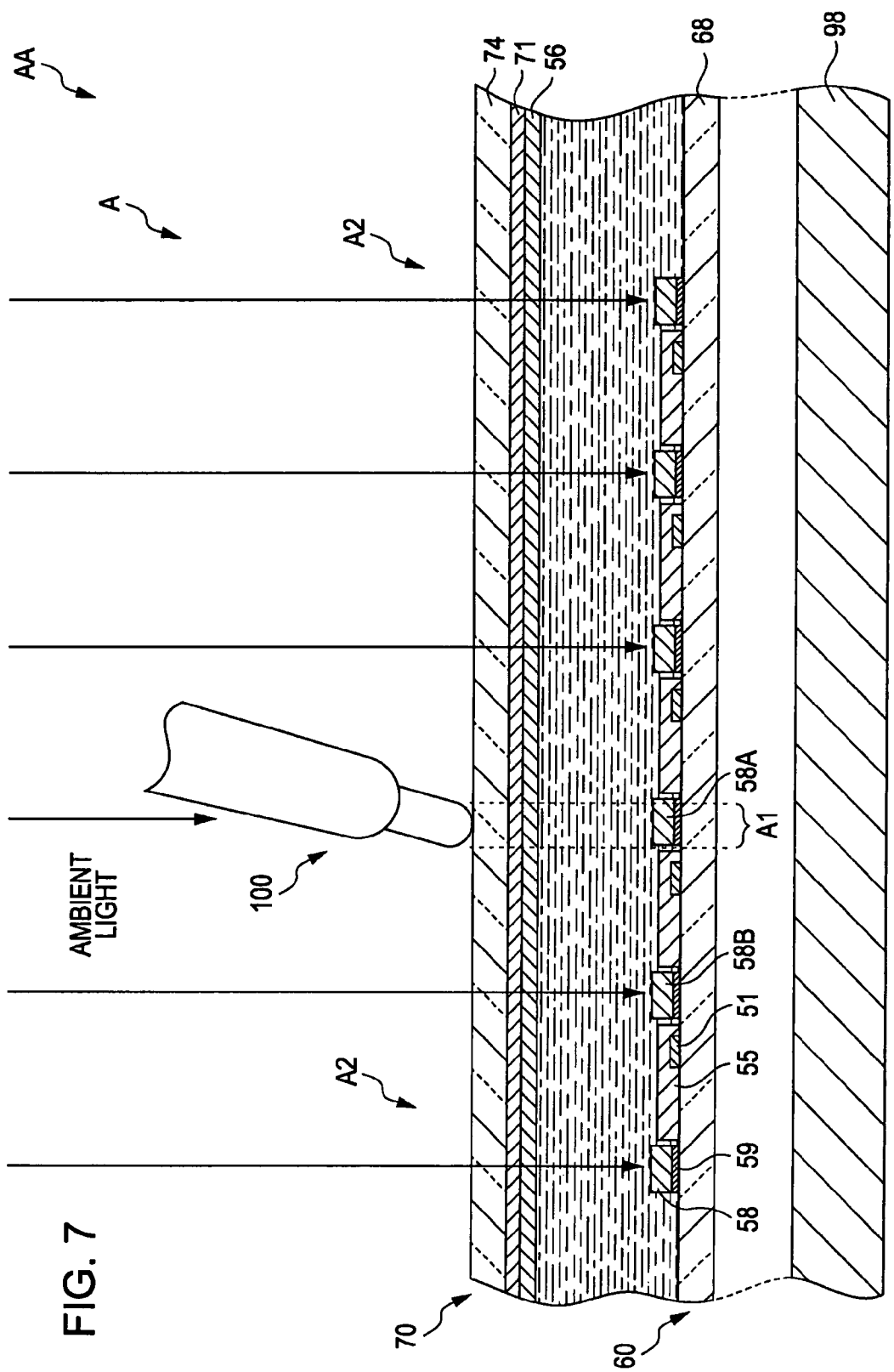
FIG. 7 is a partial cross-sectional view of the liquid crystal panel in a case where it is bright around the electro-optical device.
Figure 8:
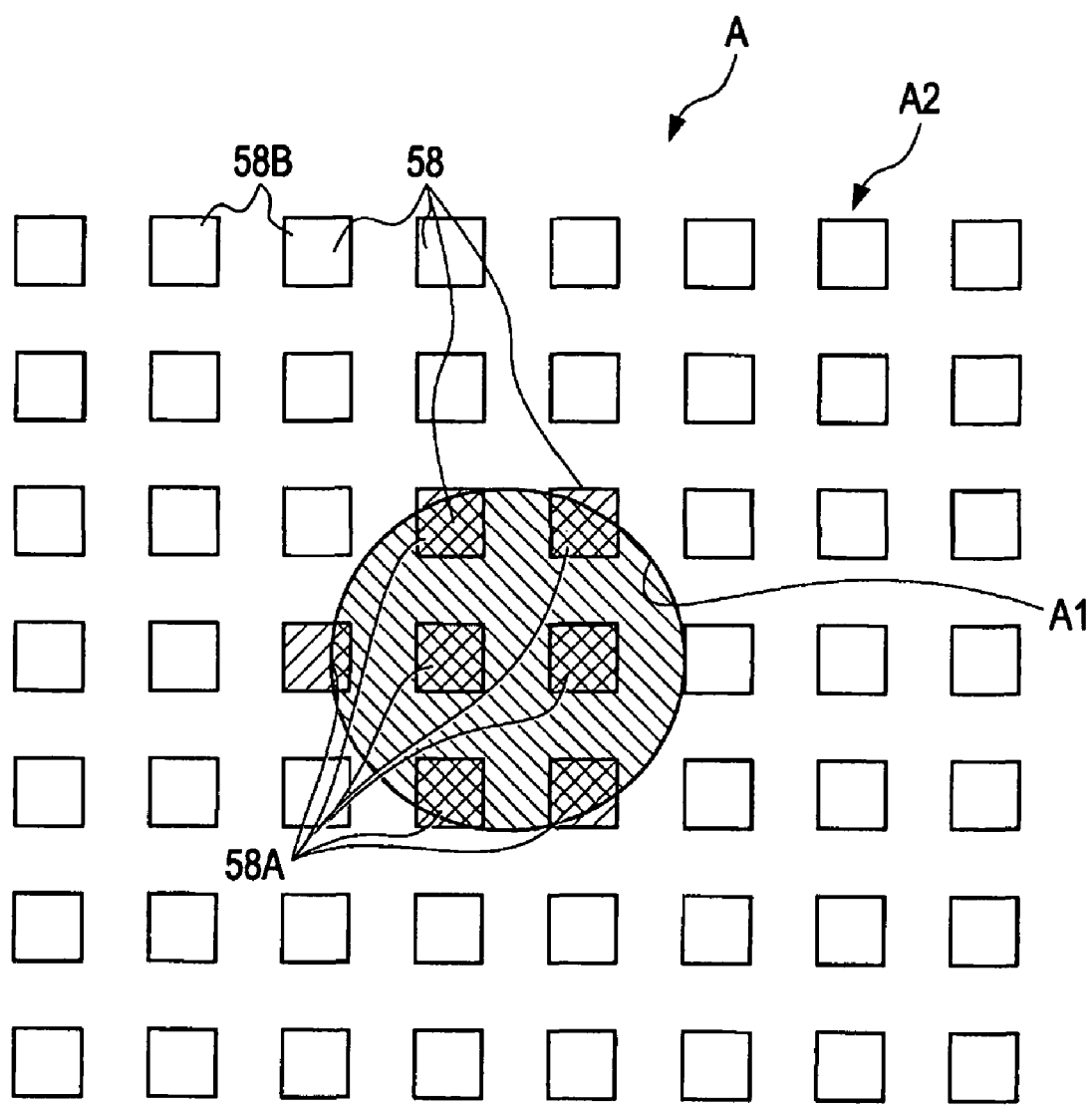
FIG. 8 is a diagram showing a display area in a case where it is bright around the electro-optical device.

When it is bright around the electro-optical device 1, if an operator operates the input pen 100 on the display area A of the electro-optical device 1, as shown in FIGS. 7 and 8, the ambient light is shielded by the input pen 100 to form a light-shielded area A1. The light-shielded area A1 is darker than a light-unshielded area A2 where the light is not shielded. Therefore, photodiodes 58A that are located in the light-shielded area A1 output a current that is smaller than photodiodes 58B that are located in the light-unshielded area A2. The current flows through the first sense lines 30 and the second sense lines 40 connected to the photodiodes 58.

Figure 9:
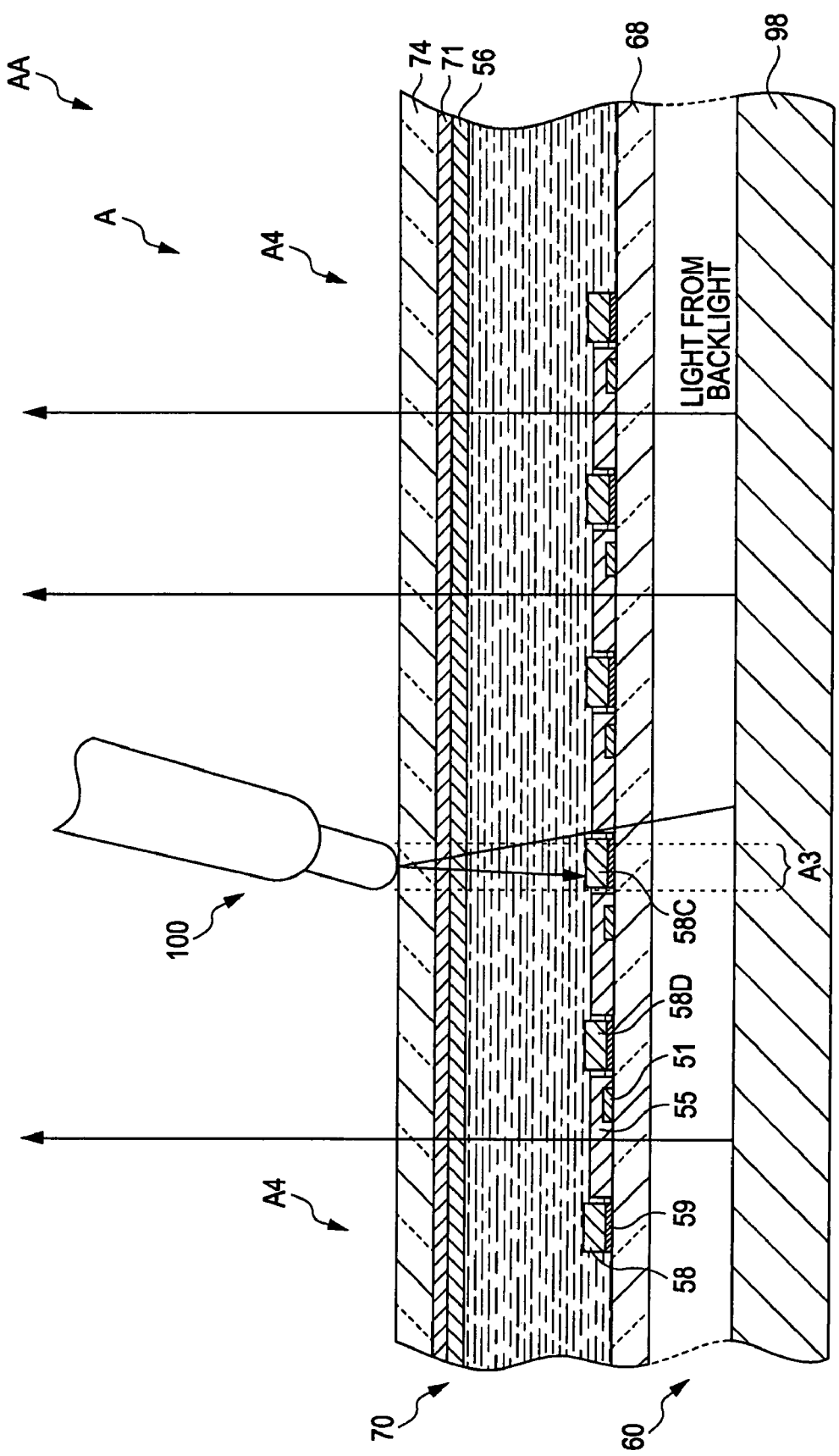
FIG. 9 is a partial cross-sectional view of the liquid crystal panel in a case where it is dark around the electro-optical device.
Figure 10:
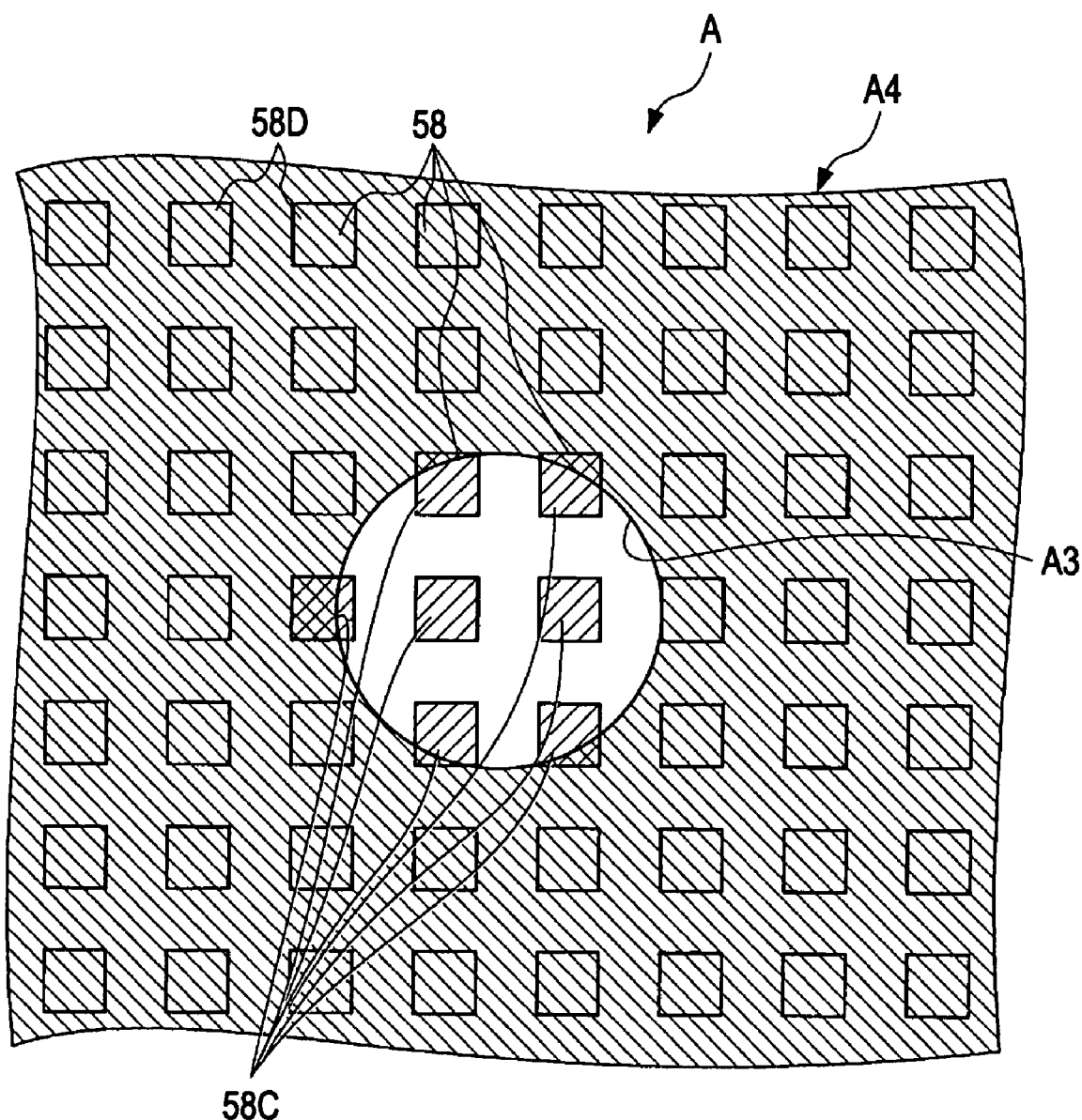
FIG. 10 is a diagram showing the display area in a case where it is dark around the electro-optical device.

When it is dark around the electro-optical device 1, if an operator operates the input pen 100 on the display area A of the electro-optical device 1, as shown in FIGS. 9 and 10, the light emitted from the backlight 98 is reflected by the input pen 100 to form an illuminated area A3. The illuminated area A3 is brighter than a non-illuminated area A4 where the light from the backlight 98 is not reflected. Therefore, photodiodes 58C that are located in the illuminated area A3 output a current that is larger than photodiodes 58D that are located in the non-illuminated area A4. The current flows through the first sense lines 30 and the second sense lines 40 connected to the photodiodes 58.

The currents flowing through the first sense lines 30 are converted into serial voltage signals by the first detection circuit 31, and the resulting signals are output to the operation position recognition circuit 95 and the ambient light measurement circuit 96. The currents flowing through the second sense lines 40 are converted into serial voltage signals by the second detection circuit 41, and the resulting signals are output to the operation position recognition circuit 95 and the ambient light measurement circuit 96.

Since the touch panel mode is selected by the mode selection circuit 94, a light intensity signal relating to the ambient light intensity is not output from the ambient light measurement circuit 96 to the backlight control circuit 97 on the basis of the serial voltage signals output from the first and second detection circuits 31 and 41. Thus, the backlight control circuit 97 controls the intensity of light supplied from the backlight 98 to the pixels 50 without using the light intensity signal.

Meanwhile, position information of the input pen 100 is output from the operation position recognition circuit 95 to the image processing circuit 92 on the basis of the serial voltage signals output from the first and second detection circuits 31 and 41.

When it is bright around the electro-optical device 1, first, a voltage signal having a lower voltage level than a predetermined voltage is extracted from the above-described voltage signals. Then, the photodiode 58 that has output a current corresponding to the extracted voltage signal is specified. Then, the position of the specified photodiode 58 is recognized as the position of the input pen 100 on the display area A, and thus the position information of the input pen 100 is output to the image processing circuit 92.

When it is dark around the electro-optical device 1, first, a voltage signal having a higher voltage level than a predetermined voltage is extracted from the above-described voltage signals. Then, the photodiode 58 that has output a current corresponding to the extracted voltage signal is specified. Then, the position of the specified photodiode 58 is recognized as the position of the input pen 100 on the display area A, and thus the position information of the input pen 100 is output to the image processing circuit 92.

When the position information of the input pen 100 is output from the operation position recognition circuit 95, the image processing circuit 92 generates the image signals according to the position information of the input pen 100, and supplies the generated image signals to the liquid crystal panel AA.

According to the first embodiment, the following advantages can be achieved.

(1) The display area A of the liquid crystal panel AA is divided into a plurality of sub-areas so as to correspond to the pixels 50, and the plurality of photodiodes 58 that are provided for the plurality of sub-areas and the operation position recognition circuit 95 that recognizes the position of the input pen 100 on the display area A on the basis of the light intensities detected by the plurality of photodiodes 58 are provided. Thus, the photodiodes 58 can be used as devices for recognizing the position of the input pen 100 on the display area A, and can also be used as devices for measuring the ambient light intensity. Therefore, the electro-optical device 1 can be used as a touch panel and can also measure the ambient light intensity.

(2) The operation position recognition circuit 95 that selectively operates in the touch panel mode, and the ambient light measurement circuit 96 that selectively operates in the normal display mode are provided. Thus, a period during which the position of the input pen 100 on the display area A is recognized and a period during which the ambient light intensity is measured are selectively provided. Therefore, even if a unique light intensity is detected by the operation using the input pen 100 on the display area A, the ambient light intensity can be determined without taking the unique light intensity into consideration, and measurement accuracy of the ambient light intensity can be increased.

(3) Since the photodiodes 58 are provided in correspondence with the pixels 50, the position of the input pen 100 on the display area A can be recognized on a pixel-by-pixel basis, and the ambient light intensity can be measured on a pixel-by-pixel basis.

(4) Since the backlight 98 and the backlight control circuit 97 are provided, the intensity of light supplied from the backlight 98 can be controlled according to the ambient brightness around the electro-optical device 1. The visibility of the display of the electro-optical device 1 can therefore be increased regardless of the ambient brightness around the electro-optical device 1.

(5) The ambient light intensity is measured according to a voltage signal that is within a predetermined voltage range among the serial voltage signals based on the currents output from the plurality of photodiodes 58. Therefore, even if a unique light intensity is detected by the operation using the input pen 100 on the display area A, the ambient light intensity can be determined without taking the unique light intensity into consideration, and measurement accuracy of the ambient light intensity can be increased.

(6) Since the photodiodes 58 are formed on the light-shielding films 59, the light from the backlight 98 can be prevented from being supplied directly to the photodiodes 58, and measurement accuracy of the ambient light intensity can be increased.

Second Embodiment

Figure 11:
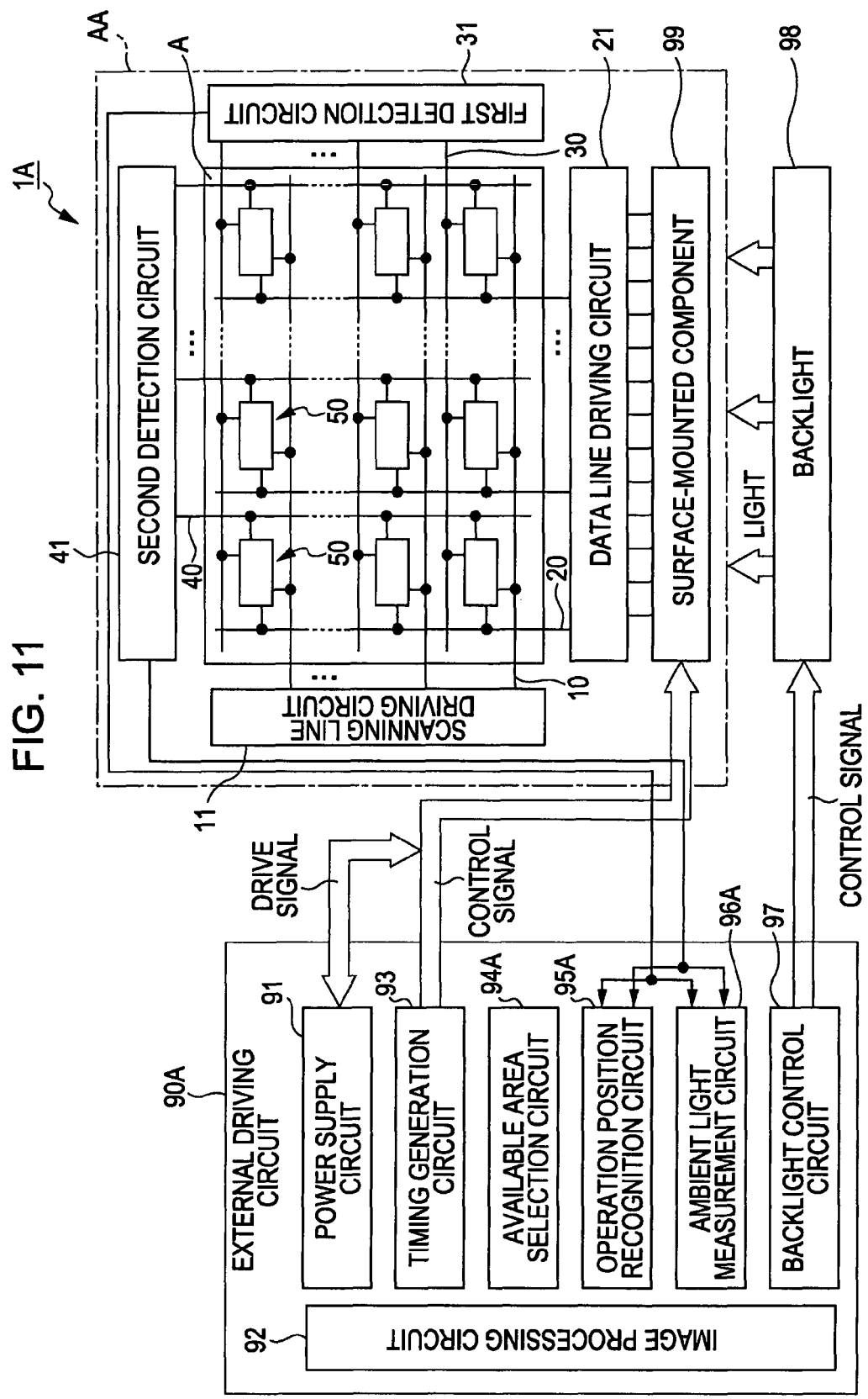
FIG. 11 is a block diagram showing the structure of an electro-optical device according to a second embodiment of the invention.

FIG. 11 is a block diagram showing the structure of an electro-optical device 1A according to a second embodiment of the invention.

The second embodiment is different from the first embodiment in that an external driving circuit 90A includes an available area selection circuit 94A, an operation position recognition circuit 95A, and an ambient light measurement circuit 96A in place of the mode selection circuit 94, the operation position recognition circuit 95, and the ambient light measurement circuit 96. Other structural features are similar to those of the first embodiment.

Figure 12:
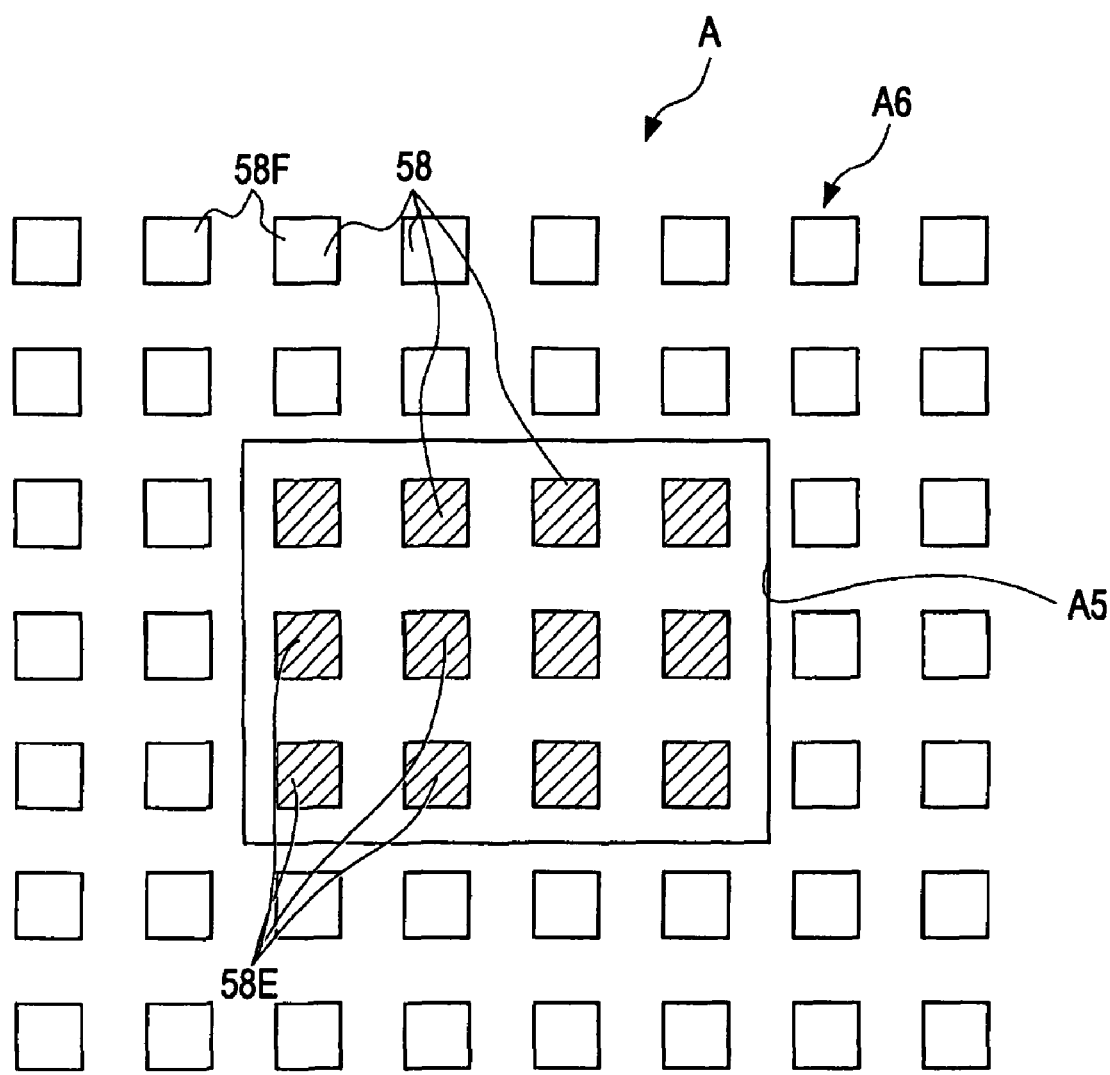
FIG. 12 is a diagram showing a display area of the electro-optical device.

FIG. 12 is a diagram showing a display area A of the electro-optical device 1A.

The available area selection circuit 94A selects from the display area A an available area A5 that can be operated by the input pen 100, and outputs position information of photodiodes 58E that are located in the available area A5 to the operation position recognition circuit 95A. The available area selection circuit 94A further selects from the display area A an unavailable area A6, other than the available area A5, and outputs position information of photodiodes 58F that are located in the unavailable area A6 to the ambient light measurement circuit 96A.

The operation position recognition circuit 95A receives the position information of the photodiodes 58E output from the available area selection circuit 94A, and the serial voltage signals output from the first and second detection circuits 31 and 41. The operation position recognition circuit 95A recognizes the photodiodes 58E located in the area that can be operated by the input pen 100 in the display area A according to the position information of the photodiodes 58E, and recognizes the position of the input pen 100 on the display area A according to a voltage signal that corresponds to the current output from the photodiodes 58E among the serial voltage signals to output the position information of the input pen 100 to the image processing circuit 92.

The ambient light measurement circuit 96A receives the position information of the photodiodes 58F output from the available area selection circuit 94A, and the serial voltage signals output from the first and second detection circuits 31 and 41. The ambient light measurement circuit 96A recognizes the photodiodes 58F located in the area other than the area that can be operated by the input pen 100 in the display area A according to the position information of the photodiodes 58F, and measures the ambient light intensity according to a voltage signal that corresponds to the current output from the photodiodes 58F among the serial voltage signals to output a light intensity signal relating to the measured ambient light intensity to the backlight control circuit 97.

The operation of the electro-optical device 1A will be described.

The electro-optical device 1A recognizes the position of the input pen 100 within an area that can be operated by the input pen 100 in the display area A according to the ambient brightness, and therefore operates as a touch panel. As well as operating as a touch panel, the electro-optical device 1A also measures the ambient light intensity within an area other than the area that can be operated by the input pen 100 in the display area A, and controls the intensity of light supplied from the backlight 98 to the pixels 50 according to the measured ambient light intensity.

Specifically, the electro-optical device 1A operates as follows.

First, position information of the photodiodes 58E that are located in the area that can be operated by the input pen 100 in the display area A is output from the available area selection circuit 94A to the operation position recognition circuit 95A and the ambient light measurement circuit 96A.

Then, when the position information of the photodiodes 58E is output from the available area selection circuit 94 and the serial voltage signals are output from the first and second detection circuits 31 and 41, the position of the input pen 100 is recognized according to a voltage signal that corresponds to the current output from the photodiodes 58E among the serial voltage signals, and position information of the input pen 100 is output from the operation position recognition circuit 95A to the image processing circuit 92.

When the position information of the photodiodes 58F is output from the available area selection circuit 94A and the serial voltage signals are output from the first and second detection circuits 31 and 41, a light intensity signal relating to the ambient light intensity is output from the ambient light measurement circuit 96A to the backlight control circuit 97 according to a voltage signal that corresponds to the current output from the photodiodes 58F among the serial voltage signals.

According to the second embodiment, the following advantages can be achieved.

(7) The ambient light intensity is measured on the basis of a current that is output from the photodiodes 58F located in the unavailable area A6 in the display area A. Therefore, even if a unique light intensity is detected by whatever operation performed within the available area A5 in the display area A, the ambient light intensity can be measured without taking the unique light intensity into consideration, and measurement accuracy of the ambient light intensity can be further increased.

Modifications

The invention is not limited to the embodiments described above, and a variety of modifications and improvements can be made without departing from the scope of the invention. Those modifications and improvements also fall within the scope of the invention.

For example, in the second embodiment, the available area A5 and the unavailable area A6 are selected by the available area selection circuit 94A as a hardware implementation. However, the invention is not limited thereto, and the selection may be implemented by software using a program.

While in the embodiments described above, the operation position recognition circuit 95 or 95A and the ambient light measurement circuit 96 or 96A are provided as separate circuits, those circuits may be combined into a single circuit.

In the embodiments described above, the photodiodes 58 are provided in one-to-one correspondence with the pixels 50. However, the invention is not limited thereto, and, for example, each of the photodiodes 58 may be provided for every adjacent two pixels 50.

In the embodiments described above, the electro-optical device 1 or 1A is configured to perform transmission mode display using light from the backlight 98. However, the invention is not limited thereto, and the electro-optical device 1 or 1A may be configured to perform transflective display including both the transmission type display and reflection type display using incident ambient light.

In the embodiments described above, the input pen 100 is used to input data to the electro-optical device 1 or 1A. However, the invention is not limited thereto, and, for example, an operator's finger may be used to input data.

The embodiments have been described in the context of the electro-optical device 1 or 1A using liquid crystal as the electro-optical material, by way of example. However, the invention is not limited thereto, and may be applied to electro-optical devices using electro-optical materials other than liquid crystal. Such electro-optical devices include organic electroluminescent (EL) display panels using organic LED (OLED) elements, electrophoresis display panels using as the electro-optical material a microcapsule including colored liquid and white particles dispersed in the liquid, twisting ball display panels using as the electro-optical material twisting balls painted with different colors for areas having different polarities, toner display panels using black toner as the electro-optical material, and plasma display panels using a high pressure gas, such as helium or neon, as the electro-optical material.

The liquid crystal in the embodiments described above may be twisted nematic (TN) liquid crystal or liquid crystal with negative dielectric constant. The in-plane switching (IPS) or fringe-field switching (FFS) liquid crystal display mode may be used.

Application Examples

An electronic apparatus including the electro-optical device 1 according to the embodiment described above will be described.

Figure 13:
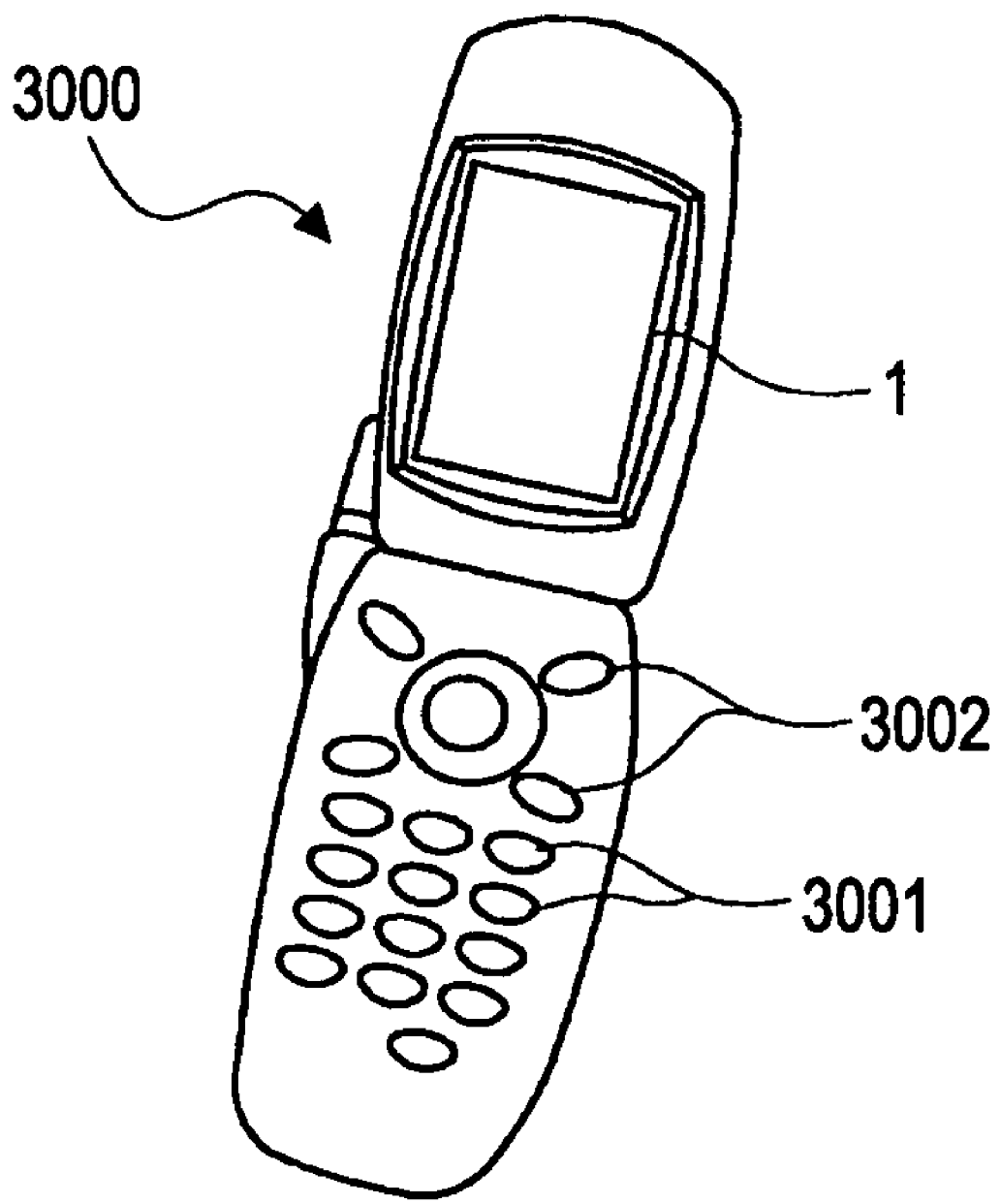
FIG. 13 is a perspective view showing the structure of a mobile phone including the above-described electro-optical device.

FIG. 13 is a perspective view showing the structure of a mobile phone 3000 using the electro-optical device 1. The mobile phone 3000 includes a plurality of operation buttons 3001 and scroll buttons 3002, and the electro-optical device 1. The scroll buttons 3002 are operated to scroll a screen displayed on the electro-optical device 1.

Electronic apparatuses using the electro-optical device 1 include, not only the mobile phone 3000 shown in FIG. 13, but also various electronic apparatuses such as personal computers, portable information terminals, digital still cameras, liquid crystal televisions, view-finder-type or monitor-direct-view-type video tape recorders, car navigation systems, pagers, electronic notebooks, electronic calculators, word processors, workstations, videophones, point-of-sale (POS) terminals, and apparatuses equipped with touch panels. The above-described electro-optical device can be used as display units of those electronic apparatuses.

The entire disclosure of Japanese Patent Application No. 2006-72272, filed Mar. 16, 2006 is expressly incorporated by reference herein.

What is claimed is:

1. An electro-optical device comprising:
    a display unit having a plurality of pixels, the display unit being divided into a plurality of areas;
    a plurality of optical sensors that are provided for the plurality of areas, each of the optical sensors being configured to detect a light intensity; and
    a controller that alternately performs
        recognition of an operation position on the display unit during a first time interval, and
        measurement of an ambient light intensity during a second time interval on the basis of the light intensities detected by the plurality of optical sensors, wherein a calculation of the ambient light intensity excludes voltage signals from any optical sensors having voltage levels that are outside of a predetermined voltage range.

2. The electro-optical device according to claim 1, wherein each pixel includes an optical sensor.

3. The electro-optical device according to claim 1, further comprising:
    a light source that supplies light to the display unit; and
    a light source controller that controls an intensity of light of the light source according to the ambient light intensity measured by the controller.

4. The electro-optical device according to claim 1, wherein the controller recognizes on operation position on the display unit according to a light intensity that is detected by an optical sensor located in a predetermined area among the plurality of optical sensors, and measures an ambient light intensity according to a light intensity detected by an optical sensor that is located in an area other than the predetermined area among the plurality of optical sensors.

5. An electronic apparatus comprising the electro-optical device according to claim 1.

* * * * *